(12) United States Patent
Bose

(10) Patent No.: US 10,546,266 B1
(45) Date of Patent: Jan. 28, 2020

(54) CONTROLLED ENVIRONMENT SHIPMENT CONTAINER AND TRACKING METHOD

(71) Applicant: Sustainable Energy & AgricultureTechnology LLC, Sahuarita, AZ (US)

(72) Inventor: Ashoke Bose, Sahuarita, AZ (US)

(73) Assignee: The Bose Family Trust, Sahuarita, AZ (US)

( * ) Notice: Subject to any disclaimer, the term of this patent is extended or adjusted under 35 U.S.C. 154(b) by 0 days.

(21) Appl. No.: 15/389,446

(22) Filed: Dec. 22, 2016

Related U.S. Application Data

(60) Provisional application No. 62/387,479, filed on Dec. 23, 2015.

(51) Int. Cl.
| | |
|---|---|
| G06Q 10/08 | (2012.01) |
| B65D 81/18 | (2006.01) |
| B65D 85/00 | (2006.01) |
| B65D 81/38 | (2006.01) |
| B65D 25/04 | (2006.01) |
| B65B 25/00 | (2006.01) |
| B65B 31/00 | (2006.01) |
| B65B 7/28 | (2006.01) |
| B65D 43/02 | (2006.01) |

(Continued)

(52) U.S. Cl.
CPC .......... *G06Q 10/0832* (2013.01); *B65B 7/28* (2013.01); *B65B 25/001* (2013.01); *B65B 31/00* (2013.01); *B65D 25/04* (2013.01); *B65D 43/02* (2013.01); *B65D 81/18* (2013.01); *B65D 81/3816* (2013.01); *B65D 85/70* (2013.01); *G06Q 10/0833* (2013.01); *H04L 67/18* (2013.01); *H04Q 9/00* (2013.01); *H04Q 2209/40* (2013.01)

(58) Field of Classification Search
CPC .. G06Q 10/0832; G06Q 10/0833; B65B 7/28; B65B 25/001; B65B 25/02; B65B 25/04; B65B 31/00; B65D 81/18; B65D 81/38
See application file for complete search history.

(56) References Cited

U.S. PATENT DOCUMENTS

| | | | | |
|---|---|---|---|---|
| 8,215,518 B2 * | 7/2012 | Hyde | ............... | B65D 81/3811 220/592.26 |
| 8,887,944 B2 * | 11/2014 | Deane | ............... | B65D 81/3802 206/499 |
| 9,389,007 B1 * | 7/2016 | McKay | ............... | F25B 27/00 |

(Continued)

*Primary Examiner* — Christopher R Harmon

(74) *Attorney, Agent, or Firm* — Invention To Patent Services; Alex Hobson

(57) ABSTRACT

A shipment container for perishable food items enables a receiver of the shipment container to track the temperature of the perishable food items during shipment and in some cases, the time and day of harvest and/or of shipment. The receive may use a remote electronic device, such as a mobile telephone, to track the shipment. The shipment container has phase change material that is used to control the temperature of the perishable food item during transient to the receiver. A phase change material is configured at least partially around a product compartment for receiving the perishable food item. The phase change material or modular temperature control compartment may be selected based on the type of perishable food item or based on the temperature of harvest. The shipment container may be locked and require input of an identification code to unlock the container upon delivery.

17 Claims, 4 Drawing Sheets

(51) Int. Cl.
*H04Q 9/00* (2006.01)
*H04L 29/08* (2006.01)

(56) References Cited

U.S. PATENT DOCUMENTS

| | | | |
|---|---|---|---|
| 9,447,995 B2* | 9/2016 | Bloedow | F25D 11/006 |
| 2007/0193297 A1* | 8/2007 | Wilson | F25D 29/00 62/371 |
| 2010/0299278 A1* | 11/2010 | Kriss | G06Q 10/08 705/332 |
| 2013/0289927 A1* | 10/2013 | Smith | G06F 17/18 702/130 |
| 2013/0306656 A1* | 11/2013 | Eckhoff | F25D 3/125 220/592.26 |
| 2014/0157797 A1* | 6/2014 | Kovalick | F25D 3/06 62/60 |
| 2015/0046364 A1* | 2/2015 | Kriss | G06Q 10/0833 705/333 |
| 2016/0107561 A1* | 4/2016 | Senaydin | B60P 3/20 454/91 |
| 2016/0347532 A1* | 12/2016 | McCormick | B65D 81/3816 |
| 2018/0039940 A1* | 2/2018 | Varga | G06Q 10/0832 |

\* cited by examiner

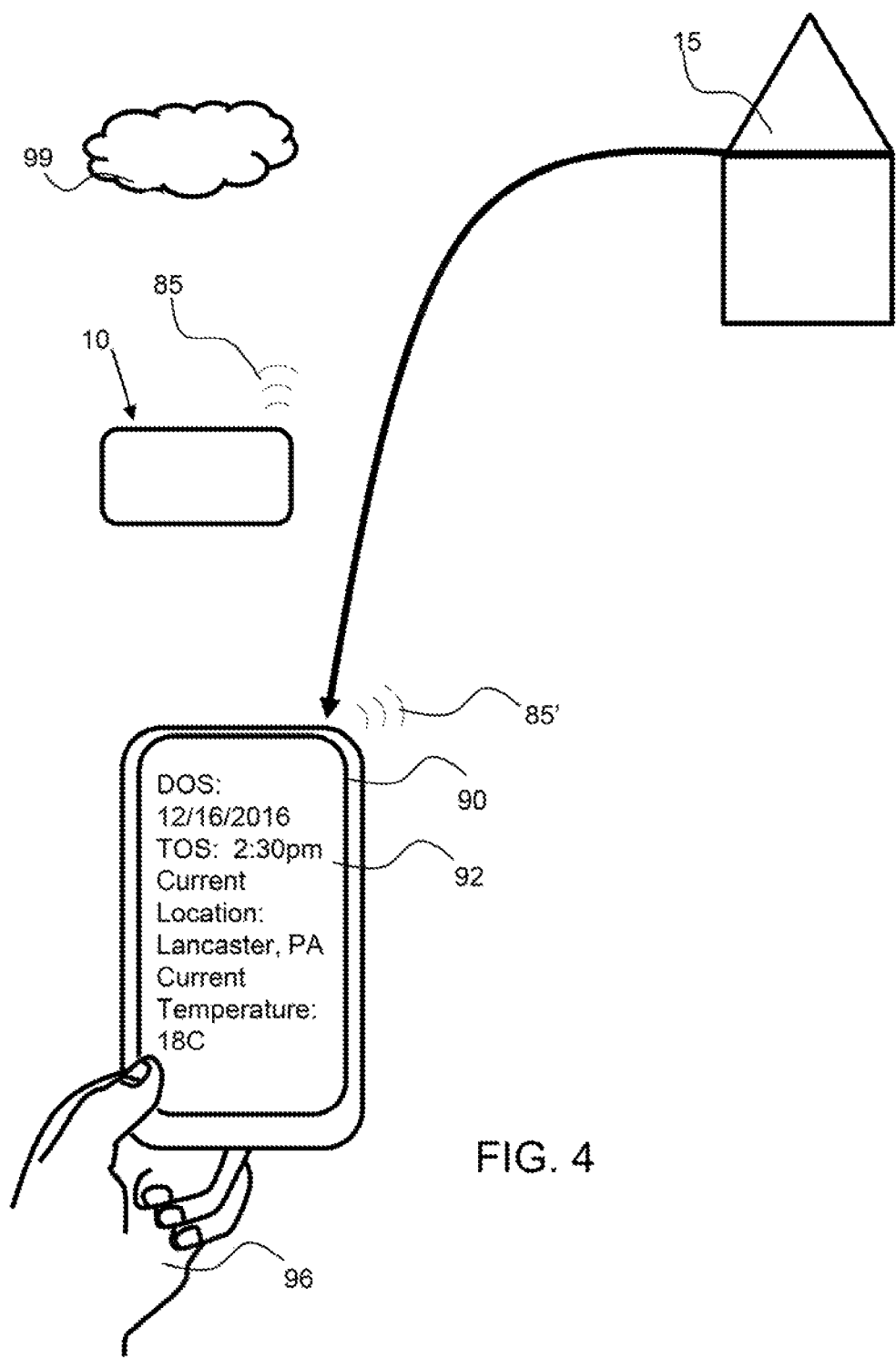

CONTROLLED ENVIRONMENT SHIPMENT CONTAINER AND TRACKING METHOD

CROSS REFERENCE TO RELATED APPLICATIONS

This application claims the benefit of priority to U.S. provisional patent application 62/387,479, filed on Dec. 23, 2015; the entirety of which is hereby incorporated by reference herein.

BACKGROUND OF THE INVENTION

Field of the Invention

The present invention is directed to shipment containers and particularly to shipment container for perishable food products having sensors for monitoring the environmental conditions of a product compartment during transit.

Background

Many people are becoming more concerned about the freshness of their produce and other perishable food products. In addition, people are routinely receiving food shipments to their homes. The food products may be shipped in an insulated container but there is currently no way to know what temperatures the food products were exposed to. Many shipping trucks are not refrigerated and warehouses can become exceeding hot. These extreme environmental conditions can have a big impact on the freshness, quality and nutritional value of the food product. In addition, consumers often want to be assured that their shipment container has not been handled or tampered with during shipment. There exists a need for a shipment container for perishable food products that maintains the food product within an acceptable temperature range and that enables monitoring of the environmental conditions of the food product during transit to the consumer. In addition, there exists a need for a shipment container and system for ensuring that the container is not tampered with before deliver.

SUMMARY OF THE INVENTION

An exemplary shipment container for perishable food items of the present invention comprises a temperature sensor that enables a recipient of the shipment container to track the temperature of the product compartment during transit. An exemplary shipment container comprises a main container body for receiving the perishable food items. An exemplary main container body comprises one or more product compartments for receiving perishable food products for delivery. A temperature control compartment may be configured with each or with a plurality of product compartments to maintain a desired temperature of the product compartment. An exemplary temperature control compartment comprises a phase change material that absorbs or releases heat as required to maintain a desired temperature of the product compartment. A temperature control compartment may extend around a product compartment, such as around all the sides of the product compartment and may extend over a top and/or a bottom of the product compartment. A temperature control compartment may substantially surround a product compartment when it extends around at least all sides of the product compartment, or surrounds the product compartment, and may additionally extend around the bottom or the top of the product compartment. A temperature compartment may comprise a cover or lid portion that extends over the product compartment, or the top of the product compartment may be covered by the closure for the main container body, which may be comprise thermal insulation. The product compartment and temperature control compartment may be integral, wherein they are attached to each other and cannot be separated. For example, a temperature control compartment may have a cavity for receiving a perishable food item and this cavity may be considered an integral product compartment. In another embodiment, a temperature control compartment is configured to receive one, two or more product compartment therein. The temperature and product compartments may be modular, wherein the number and size and temperature range may be selected for the perishable food items ordered.

An exemplary shipment container comprises a temperature sensor for monitoring the temperature of a product compartment and may also comprise a moisture level sensor such as a relative humidity sensor to monitor the moisture or humidity level of a product compartment and a global positioning sensor, GPS, for monitoring the location of the shipment container. The data measured by these sensors may be retrieved by a receiver of the shipment container through a control system. In addition, a shipment container may comprise a time device that measures and reports time and day data to a database and this data may be associated with the data from the sensors to enable reporting of temperature or humidity level as a function of time. An exemplary shipment container may have a wireless signal transmitter and/or receive for communication of data with a database, a product supplier and/or with a receiver of the shipment container. A receiver of a shipment container may have an identification number that is used to retrieve information about the shipment container, such as the temperature and/or the humidity level of the product compartments during transit, the day and time of harvest of the perishable food items, and/or the day and time of packaging and/or shipment. In this way, a receiver of the shipment container can know how long it took between harvesting and packaging and/or shipment, time from harvesting to receipt of the shipment container and temperature and/or humidity of a product compartment throughout transit to the receiver.

An exemplary control system comprises a controller that may include a micro-processor for controlling the functions of the shipment container. A controller may receive and then transmit data regarding the shipment container, such as temperature and humidity level, to a data storage device, such as a database and a receiver of the shipment container may interface with the database to retrieve this data. In another embodiment, data is stored on a data storage device that is configured with the shipment container and a receiver of the shipment container may interface with this data storage device upon deliver to retrieve this data. A signal transmitter of the shipment container may send data from one or more sensor and/or the time device directly to a remote electronic device, whereby the data is not stored on a remote data storage device.

A shipment container may comprise a user interface for inputting data and/or for interfacing with the control system. An exemplary user interface may be a key board for inputting identification numbers and the like. An interface may also include a scanner, such as a bar code scanner, that may be used to scan a bar code associated with a perishable food item of the shipment order. For example, a customer may order two different perishable food items, broccoli and asparagus. The product provider, such as a greenhouse, may receive the order and produce an order identification number and an identification number for each of the perishable food items. The time and day of harvest for each of the items may be recorded and associated with the specific food item identification numbers. When the food items are packaged and/or shipped, the day and time may also be recorded. A bar code may be generated for each of the food items and this bar code may be scanned after harvest and after packaging and/or shipment to record the day and time of these events.

An exemplary temperature control compartment of a shipment container comprises a phase change material (PCM), that is thermal communication with a product compartment to control the temperature of the product compartment during transit from the product provider to the receiver of the shipment container. A phase change material controls the temperature of the product compartment by absorbing and releasing heat. A phase change material releases heat, latent heat of fusion, when the material freezes. The latent heat of fusion, or enthalpy of fusion of a substance, is the change in its enthalpy resulting from providing energy, typically heat, to a specific quantity of the substance to change its state from a solid to a liquid at constant pressure. For example, a phase change material may melt to absorb heat to maintain a temperature of a product compartment. An exemplary phase change material is a substance with a high heat of fusion that is capable of storing and releasing large amounts of energy. The heat of fusion of a phase change material is the heat that is stored and absorbed or released when the material changes from solid to liquid. Phase change materials are classified as latent heat storage (LHS) units. Phase change materials may have an increase in temperature when in a solid phase until the temperature reaches the melting temperature, at which point the phase change material melts from a solid to a liquid and absorb large amounts of heat at an almost constant temperature. The PCM then continues to absorb heat without a significant rise in temperature until all the material is transformed to the liquid phase. When the temperature of the phase change material in the liquid phase drops back to the melting point, the phase change material solidifies, releasing the stored latent heat. The volumetric heat capacity of a phase change material is defined as:

Volumetric heat capacity (VHC) $J \cdot m^{-3} \cdot K^{-1}$

Phase change materials are available with melting temperature ranging from −5 up to 190° C. and many within the lower and upper threshold limits of ideal temperatures for storing perishable food items. A phase change material with a specific melting point may be selected based on the type of perishable food item or based on the temperature of harvest. Phase change materials may be selected having a melting point that is greater than about freezing or about 0° C., greater than about 10° C., greater than about 20° C., greater than about 30° C., or less than about 50° C., less than about 40° C., less than about 30° C., less than about 20° C., less than about 10° C., or any range between and including these temperatures, such as between about 10° C. and about 30° C. Phase change materials can store five to fourteen times more heat per unit volume than conventional storage materials such as water, masonry or rock. For this reason, phase change materials are preferred as a heat sink in the present invention. In an exemplary embodiment, a phase change material may have a melting temperature that is within the desired shipment temperature range or between the upper and lower threshold limits. This enables the phase change material to melt if the shipment container is exposed to temperatures above an upper threshold limit and freeze or solidify if the shipment container is exposed to temperatures below a lower threshold limit.

Any suitable type of phase change material may be used including, but not limited to salt hydrates, fatty acids and esters, and various paraffins (such as octadecane) and ionic liquids. Most organic solutions type phase change materials are water-free, and can therefore be exposed to air. However, salt based phase change materials must be sealed in an enclosure to prevent water evaporation or uptake. Suitable phase change materials are available from Climator Sweden AB, Entropy Solution LLC and PureTemp Inc., of Plymouth Minn., Pluss Advanced Technologies Ltd of India and RGEES LLC, Candler, N.C. An exemplary phase change material is PCM-HS22P from RGEES LLC, an inorganic hydrated salt mixture having a melting temperature of 23° C., liquid density of 1540 kg/m$^3$, solid density of 1840 kg/m$^3$, latent heat of 185 kJ/kg, and specific heat-liquid 0.73 kcal/kg.K).

Table 1 provides a list of some exemplary paraffin phase change materials.

TABLE 1

| Material | Melting point ° C. | Heat of fusion kJ · kg$^{-1}$ |
|---|---|---|
| Paraffin 14-Carbons [35] | 5.5 | 228 |
| Paraffin 15-Carbons [35] | 10 | 205 |
| Paraffin 16-Carbons [35] | 16.7 | 237.1 |
| Paraffin 17-Carbons [35] | 21.7 | 213 |
| Paraffin 18-Carbons [35] | 28 | 244 |
| Paraffin 19-Carbons [35] | 32 | 222 |
| Paraffin 20-Carbons [35] | 36.7 | 246 |
| Paraffin 21-Carbons [35] | 40.2 | 200 |
| Paraffin 22-Carbons [35] | 44 | 249 |
| Paraffin 23-Carbons [35] | 47.5 | 232 |
| Paraffin 24-Carbons [35] | 50.6 | 255 |
| Paraffin 25-Carbons [35] | 49.4 | 238 |
| Paraffin 26-Carbons [35] | 56.3 | 256 |
| Paraffin 27-Carbons [35] | 58.8 | 236 |
| Paraffin 28-Carbons [35] | 61.6 | 253 |
| Paraffin 29-Carbons [35] | 63.4 | 240 |
| Paraffin 30-Carbons [35] | 65.4 | 251 |
| Paraffin 31-Carbons [35] | 68 | 242 |
| Paraffin 32-Carbons [35] | 69.5 | 170 |
| Paraffin 33-Carbons [35] | 73.9 | 268 |
| Paraffin 34-Carbons [35] | 75.9 | 269 |

TABLE 2

| Material | Melting point ° C. | Heat of fusion kJ · kg$^{-1}$ |
|---|---|---|
| Formic acid [35] | 7.8 | 247 |
| Caprilic acid [35] | 16.3 | 149 |
| Glycerin [35] | 17.9 | 198.7 |
| p-Lattic acid [35] | 26 | 184 |
| Methyl palmitate [35] | 29 | 205 |
| Camphenilone [35] | 39 | 205 |
| Docasyl bromide [35] | 40 | 201 |
| Caprylone [35] | 40 | 259 |
| Phenol [35] | 41 | 120 |
| Heptadecanone [35] | 41 | 201 |
| 1-Cyclohexylooctadecane [35] | 41 | 218 |
| 4-Heptadacanone [35] | 41 | 197 |
| p-Joluidine [35] | 43.3 | 167 |
| Cyanamide [35] | 44 | 209 |
| Methyl eicosanate [35] | 45 | 230 |
| 3-Heptadecanone [35] | 48 | 218 |
| 2-Heptadecanone [35] | 48 | 218 |
| Hydrocinnamic acid [35] | 48 | 118 |
| Cetyl acid [35] | 49.3 | 141 |
| α-Nepthylamine [35] | 59 | 93 |
| Camphene [35] | 50 | 238 |
| O-Nitroaniline [35] | 50 | 93 |

TABLE 2-continued

| Material | Melting point ° C. | Heat of fusion kJ · kg$^{-1}$ |
|---|---|---|
| 9-Heptadecanone [35] | 51 | 213 |
| Thymol [35] | 51.5 | 115 |
| Methyl behenate [35] | 52 | 234 |
| Diphenyl amine [35] | 52.9 | 107 |
| p-Dichlorobenzene [35] | 53.1 | 121 |
| Oxolate [35] | 54.3 | 178 |
| Hypophosphoric acid [35] | 55 | 213 |
| O-Xylene dichloride [35] | 55 | 121 |
| β-Chloroacetic acid [35] | 56 | 147 |
| Chloroacetic acid [35] | 56 | 130 |
| Nitro napthalene [35] | 56.7 | 103 |
| Trimyristin [35] | 33 | 201 |
| Acetic acid [35] | 16.7 | 184 |
| Polyethylene glycol 600 [35] | 20 | 146 |
| Capric acid [35] | 36 | 152 |
| Eladic acid [35] | 47 | 218 |
| Pentadecanoic acid [35] | 52.5 | 178 |
| Tristearin [35] | 56 | 191 |
| Myristic acid [35] | 58 | 199 |
| Palmatic acid [35] | 55 | 163 |

A temperature control compartment may have an inner wall that forms a product compartment for receiving a perishable food item, wherein the product compartment is an integral product compartment. Thermal energy may be transferred through the inner wall of the temperature control compartment directly to the product compartment in this case. In another embodiment, one, two or more product compartments are placed within a temperature control compartment and thermal energy is transferred through the outer wall of the product compartment and then through the inner wall of the temperature control compartment. A product compartment may be a rigid container and this container may comprise thermal insulation, or it may be flexible container, such as a bag. Produce may be picked and then sealed in bag, or vacuum sealed in a bag and then placed within a temperature control compartment for shipment.

A method off tracking a shipment is provided by the exemplary shipment container, as described herein. In an exemplary tracking method, an order is placed and an identification number, or tracking number is placed for the order and/or for each item of the order. This identification number may be provided to the person placing the order and they may use this identification number to look up data about the shipment and to track the temperature and/or humidity level of the product compartments during transit from the product provider. The time and day of harvest along with the time and day of packaging and/or shipment may be input into the control system and stored in a data storage device, such as a database or on an integral data storage device located with the shipment container. The receiver of the shipment container may retrieve this time stamp data through a remote electronic device, such as a mobile telephone, that interfaces with the database through application software, or app. The user may also interface with the database or directly with a shipment container to retrieve GPS data about the shipment package location and/or temperature and/or humidity data during transit.

An exemplary shipment container may comprise a lock that prevents a closure of the shipment container from being opened. A receiver of the shipment container, or a mail carrier may input the identification number or some other password into the user interface to enable the package to be opened. For example, when the shipment container is delivered and confirmation of receipt is received by the controller, a signal may be sent wirelessly to the shipment container to unlock the lock and allow the receiver to open the package. In this way, there is no requirement of the receiver to input a password, rather the password or unlocking is accomplished automatically as a result of a delivery confirmation. Likewise, a receiver of a delivered shipment container, as described herein, may interface with an electronic device, such as a mobile telephone, to confirm deliver of the shipment container and this may unlock the lock on the shipment container. The mobile telephone may utilize an app software that relays a wireless signal and a wireless signal may then be sent to the shipment container to unlock the lock.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 4 shows an exemplary shipment container in transit from a product provider to a receiver.

Figure 1:
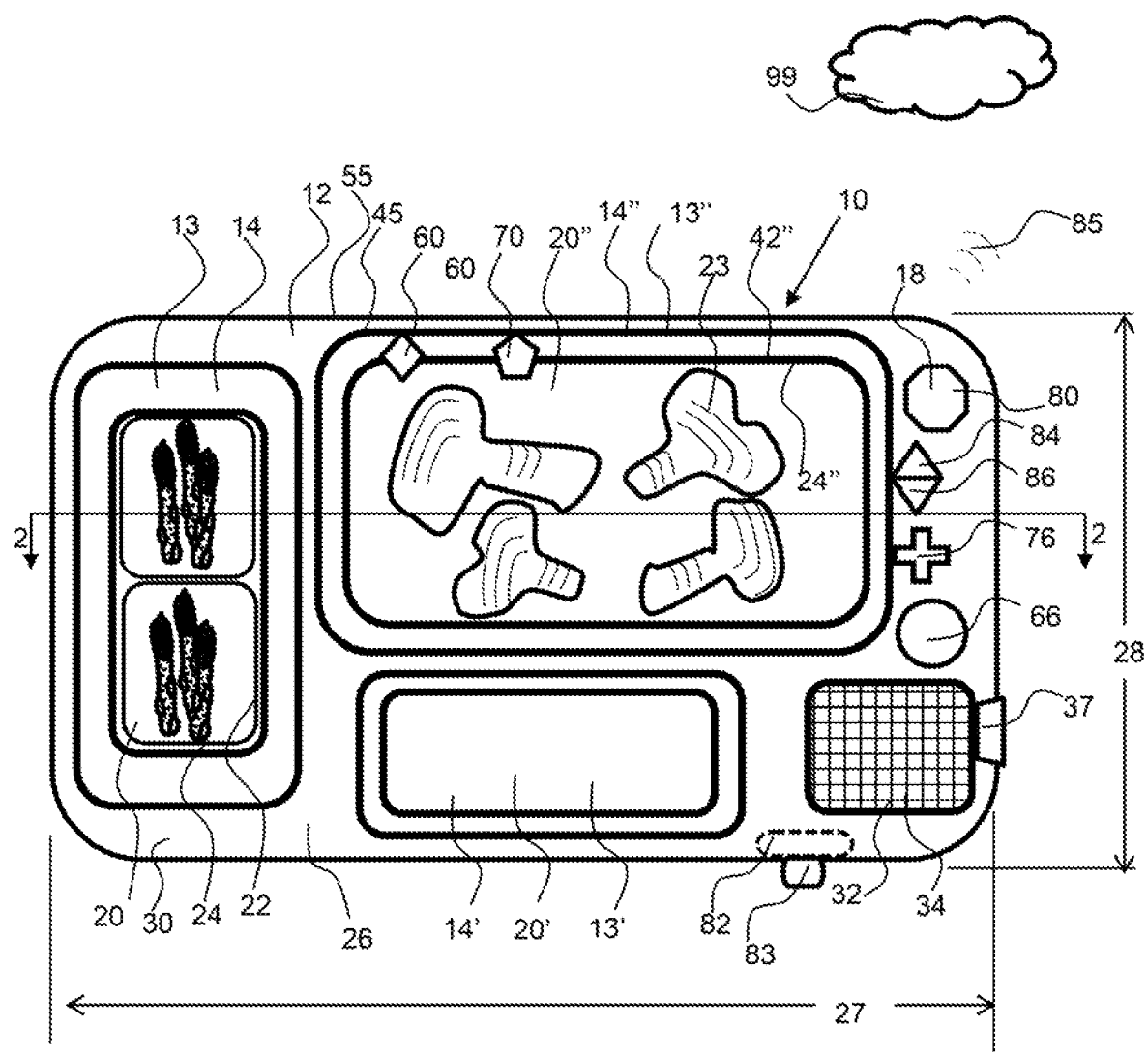
FIG. 1 shows a top view of an exemplary shipment container having a main container body with a product compartment, a temperature control compartment having a phase change material configured therein and a control system.
Figure 1:
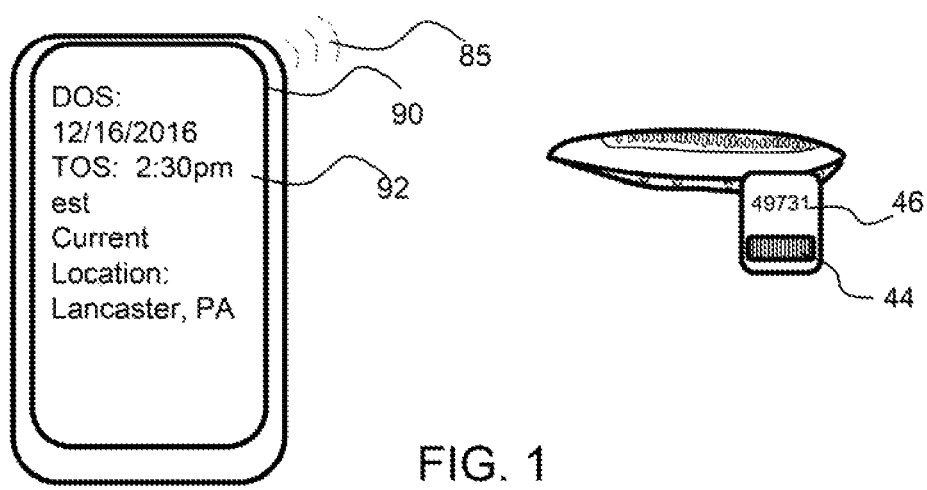

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
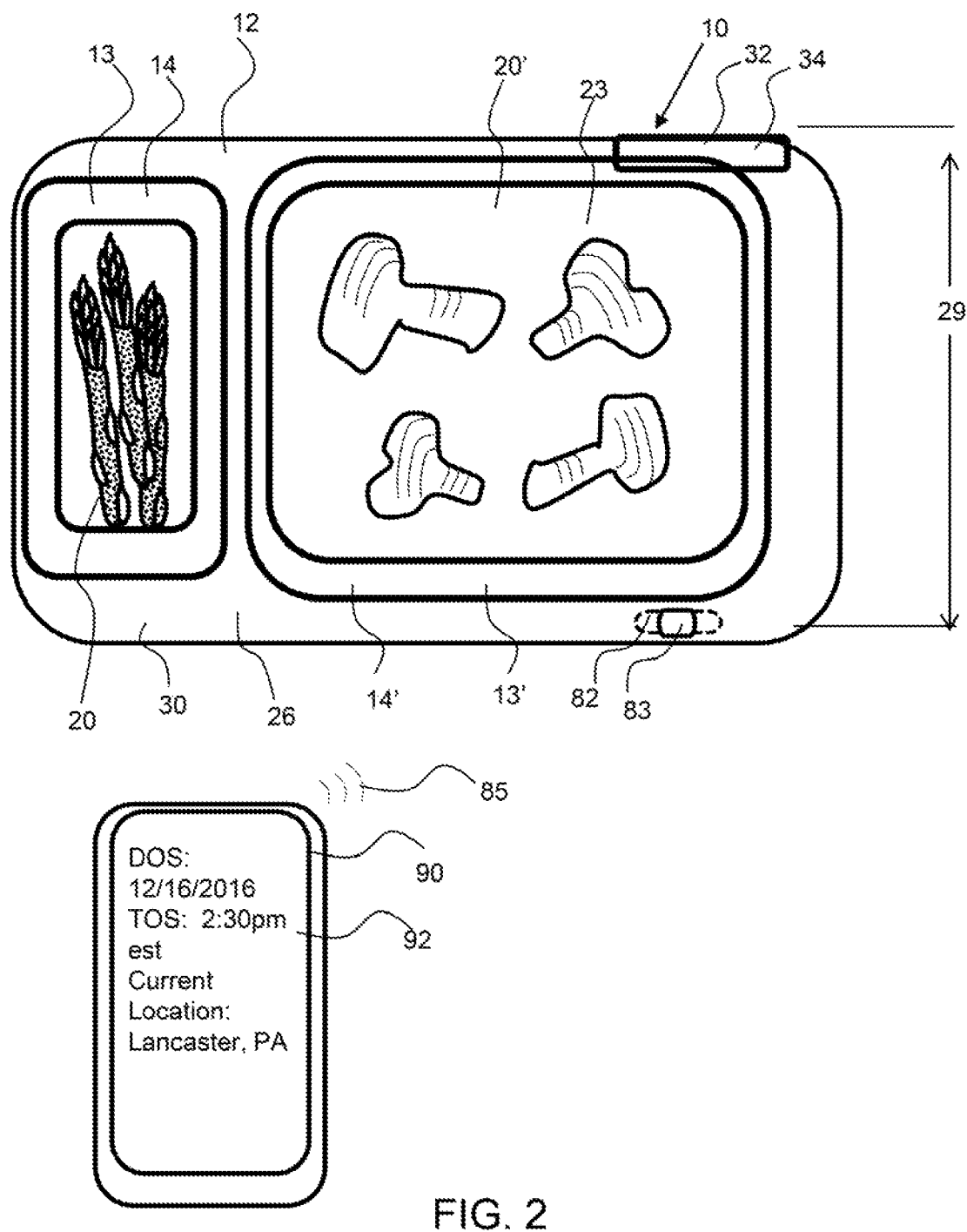
FIG. 2 shows a cross-sectional view of the exemplary shipment container shown in FIG. 1, along line 2-2.

Referring to FIGS. 1 and 2, an exemplary shipment container 10 has a main container body 12, a plurality of product compartments 20-20", a plurality of temperature control compartments 14-14", with a phase change materials 12-13", respectively, configured therein. The temperature control compartments and the product compartments may be integrally attached, wherein the product compartment has a cavity that forms the product compartment and the phase change material may be configured substantially around the product compartment, as shown, or configured at least partially around the product compartment. The inner wall 42" of the temperature control compartment 40 may form an outer wall 24" of the product compartment. As shown in FIG. 1, temperature control compartment 14" has an integral product compartment, or cavity configured within the temperature control compartment for receiving a food product. In this way, the type of temperature control compartment, having a specific PCM and therefore a particular temperature control range for a food product, may be selected for a specific perishable food item. A shipment container may comprise one or more product compartments 20 and temperature control compartments 14 and they may be modular. As shown in FIG. 1, temperature control compartment 14 has two separate product compartments configured therein. The product compartment may be placed into the inner cavity of the temperature control compartment 14, wherein the outer wall 24 of the product compartment 20 is within the inner wall of the temperature control compartment. The product compartments in temperature control compartment 14 have an outer wall 24 and an inner wall 22, and may be a rigid compartment or a flexible compartment, such as a bag. It may be possible to place two or more product compartment in a single temperature control compartment as well. Also, it is to be understood that the shipment container may have any number of shapes, including box shaped as shown, or cylindrical shaped with a temperature control compartment around a centrally located product compartment, and the like. As shown, the main container body has a length 27, a width 28 and a height 29. A thermally insulating material 26 is configured within the main container body 12 and around the product compartment. The temperature control compartments may be in direct contact with the product compartment, as shown, so that thermal conduction from the product compartment and the temperature control compartments can take place, wherein the product compartment is in thermal communication with the product compartment. A closure 30 may be configured over the main container body to seal the product compartments or each product compartment may have a separate closure or lid and this lid may comprise a phase change material and form part of the temperature control compartment. A temperature control compartment may envelop or completely surround a product compartment, wherein the temperature control compartment comprises a closure comprising a phase change material and the entire outer surface of the product compartment is surrounded by the temperature control compartment. A temperature control compartment may be configured within the outer wall 55 of a main container body 12 or the outer wall 45 of the temperature control compartment may make up the outer wall of the main container body.

The exemplary shipment compartment comprises a plurality of sensors including a temperature sensor 60, a moisture sensor 70, such as a relative humidity sensor, a global positioning device 76 as well as a time device 686. The conditions of the product compartment and/or the temperature control compartments may be monitored for temperature and moisture and this data may be stored in the data storage device 82 that is configured on the shipment container or is sent to a database or remote electronic device 90. In one embodiment, a receiver of the shipment container may attach a mobile phone 92 to the data interface 83 to download recorded data, such as temperature, moisture or humidity level, time of shipment, time of packaging, day of packaging and the like. In another embodiment, data is transmitted to a database 99 and a receiver of the shipment container may use a remote electronic device 90 to download data or view data related to their shipment container. For example, after placing an order, a receiver of a shipment container may receive a confirmation code and they may interface with a website 99 or mobile app to input this confirmation code to receive data about the shipment container.

The exemplary shipment container 10 has a controller 18 that may control any number of the functions of the container, including sending and receiving data, locking and unlocking the container and the like. A controller may have a micro-processor 80 that controls these functions. The controller may be interfaced with the sensors, the global positioning device 76 as well as the time device 66. The controller may receive a wireless signal 85' from the single receiver 86 requesting data transmission, and the controller may then send a signal with the data through the single transmitter 84.

The exemplary shipment container 10 has a user interface 32, such as a key pad, that may be used input an identification code or tracking number for the shipment. An interface may also be a scanner 37, or scanner input feature for receiving information about the order, the identification code, the time and day of harvest, the time and day of packaging and the like. For example, an order may be placed and a tracking or identification code may be generated for the order. This identification code may then be used to track the time and day of harvest of the product. A bar code 44, as shown being used to track one of the perishable food items 23', may comprise an identification code 46 and may be scanned when a product is harvested, packaged and/or delivered. As shown in FIG. 1, the perishable food item 23' is ready for placement in the product compartment 20'. The bar code 44, may be scanned when the perishable food item is placed in the product compartment and this scanning or inputting of the identification number may set the time and day of packaging for that perishable food item. A bar code or identification number may have data associated with it that is stored in a data storage device, such as a computer, data storage device on the shipment container or in a remote data device, such as a database, that may interface with to retrieve the data. For example, when a product is harvested, the time and day of harvest may be input into a control system that then stores this data in a database of computer for example. When the product is packaged, again the time and day of packaging may be input into the control system using the identification code. With this data in the system, the time for delivery and time from harvest to packaging can be determined and provided through the control system.

A thermally insulating material may comprise a foam or other air trapping material.

A thermally conductive material may comprise metal or other thermally conductive material. The inner wall of a temperature control compartment may comprise a thermally conductive material to enable better heat transfer with the product compartment. The outer wall of a temperature control compartment may comprise a thermally insulating material.

Figure 3:
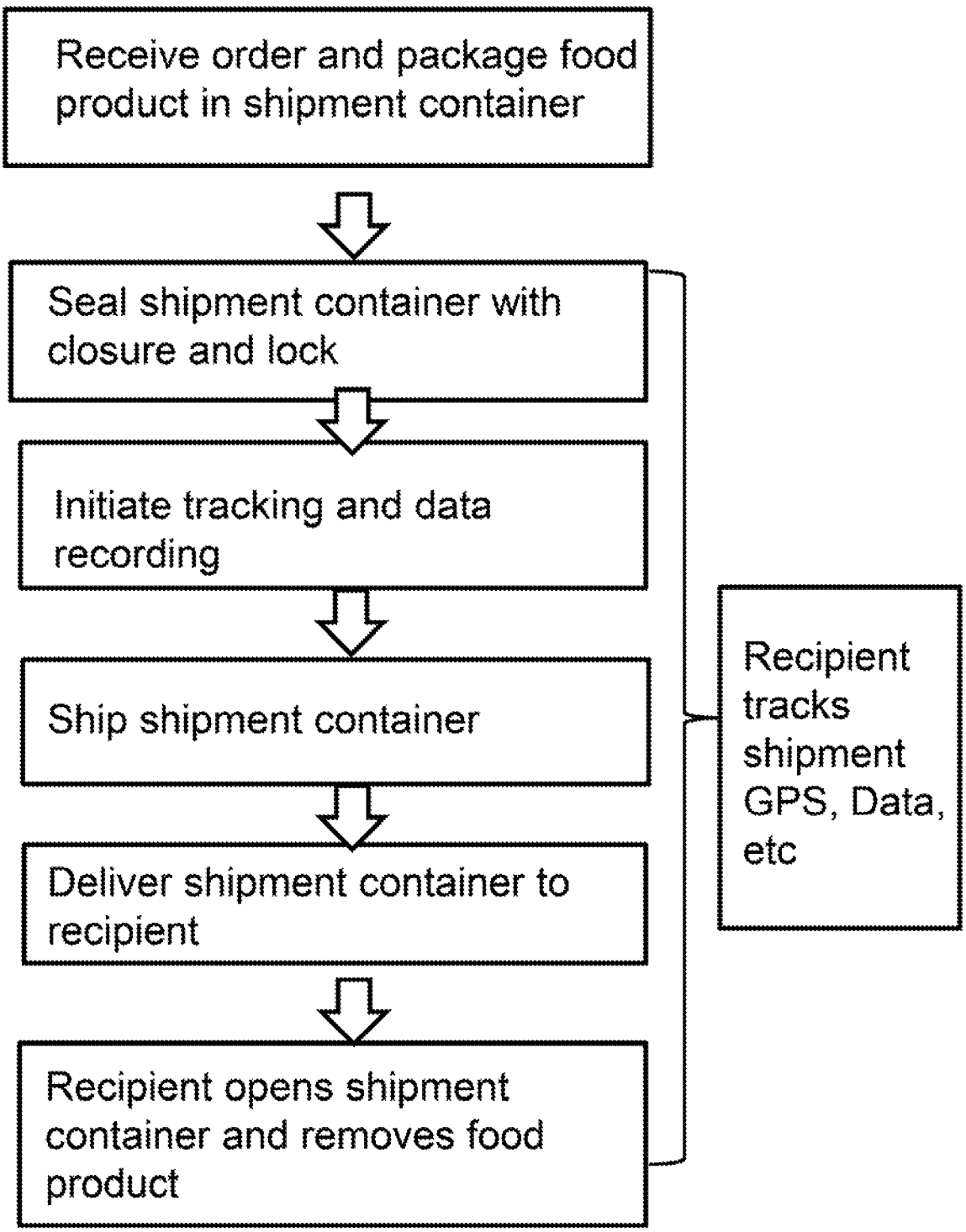
FIG. 3 shows a flow chart of an exemplary shipping method incorporating a shipment container, as described herein.

As shown in FIG. 3, an exemplary shipping method incorporates a shipment container, as described herein, and enables a shipment receiver to track the environmental conditions of the food product in the shipment container during transit, or upon receipt of the shipment. As described herein, when placing an order for a perishable food product, a user may receive a confirmation code, or identification number, that can be used to retrieve data about the product and the shipment container, such as when the product was harvested, when the shipment container was packaged and shipped, the temperature and/or humidity level of the product compartment, location of shipment container and elapse time from harvest to shipment or packaging, or time from harvest to receipt of the shipment container, for example.

As shown in FIG. 4, an exemplary shipment container 10 is in transit from a product provider 15 to a receiver 96. The receiver is using a remote electronic device 90, a mobile telephone 92, to retrieve data about the shipment container. The mobile telephone is accessing this data wirelessly by interfacing with a database 99. The shipment container is sending a wireless signal 85 to the database and the mobile telephone is receiving this data. The data displayed on the mobile telephone includes time of shipment (TOS) and date of shipment (DOS), current location of the shipment container and temperature of one of the product compartments, 18° C.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A shipment container system comprising:
a) a shipment container comprising a main container body comprising:
   i) a plurality of product compartments for receiving a perishable food product for delivery;
   ii) a plurality of temperature control compartments that each are in thermal communication with one of said plurality of product compartments to control a temperature of said perishable food product, said plurality of temperature control compartments comprising:
      a first temperature control compartment having a first phase change material, wherein the first temperature control compartment is configured substantially around a first product compartment;
      second temperature control compartment having a second phase change material, wherein the second temperature control compartment is configured substantially around a second product compartment, and
      wherein the first phase change material is different from said second phase change material and wherein the first product compartment is retained at a different temperature than the second product compartment;
b) a temperature sensor for measuring the temperature of the product compartment;
c) a data storage device for recording the temperature of the product compartment;
d) a closure that seals the main container body;
e) a controller;
wherein the phase change material is configured in said temperature control compartment;
g) a wireless signal transmitter configured with the shipment container;
h) a time device for recording a date and a time; and
i) a global positioning device for determining a location of the shipment container configured with the shipment container;
ii) a remote electronic device; and
wherein said wireless signal transmitter transmits said location of said shipment container and the temperature of the product compartment to said remote receiver electronic device.

2. The shipment container of claim 1, wherein the first phase change material has a melting point from about 5° C. to about 30° C.

3. The shipment container of claim 1, wherein the data storage device is configured with the main container body.

4. The shipment container of claim 1, wherein the receiver remote electronic device is a mobile phone.

5. The shipment container of claim 1, wherein each of the product compartments is an integral product compartment; wherein the product compartment is a cavity within the temperature control compartment.

6. The shipment container of claim 1, wherein the date is the date of harvest and the time is a time of harvest.

7. The shipment container of claim 1, wherein the date is the date of shipment and the time is a time of shipment.

8. The shipment container of claim 1, further comprising a moisture device for recording a moisture level of the product compartment.

9. A method of shipping a perishable food product in a shipment container comprising the steps of:
a) providing said shipment container system comprising:
   i) a shipment container comprising a main container body comprising:
      a plurality of product compartments for receiving a perishable food product for delivery;
      a plurality of temperature control compartment that each are in thermal communication with one of said plurality of product compartments to control a temperature of said perishable food product, said plurality of temperature control compartments comprising:
         a first temperature control compartment having a first phase change material, wherein the first temperature control compartment is configured substantially around a first product compartment;
         second temperature control compartment having a second phase change material, wherein the second temperature control compartment is configured substantially around a second product compartment, and
      wherein the first phase change material is different from said second phase change material and wherein the first Product compartment is retained at a different temperature than the second product compartment;
  ii) a temperature sensor for measuring the temperature of the product compartment;
  iii) a data storage device for recording the temperature of the product compartment;
  iv) a closure that seals the main container body; and
  v) a controller;
  vi) a temperature control compartment configured substantially around the product compartment;
  wherein the phase change material is configured in said temperature control compartment;
  vii) a wireless signal transmitter;
  ix) a time device for recording a date and a time; and
  x) a global positioning device for determining a location of the shipment container; and
  xi) a remote receiver electronic device configured with a receiver of the shipment container; and
    wherein said wireless signal transmitter transmits said location of said shipment container and the temperature of the product compartment to said remote receiver electronic device;
b) placing said perishable food product into the product compartment and sealing the main container body with the closure;
c) shipping the shipment container to said receiver;
d) monitoring the temperature of the product compartment with the temperature sensor;
e) delivering the shipment container to said receiver; and
f) wherein said wireless signal transmitter transmits said location of said shipment container and the temperature of the product compartment to said remote receiver electronic device.

10. The method of shipping a perishable food product in a shipment container of claim 9, wherein the first phase change material is selected has a melting temperature from 5° C. to 30° C.

11. The method of shipping a perishable food product in a shipment container of claim 9, wherein the data storage device is configured with the main container body.

12. The method of shipping a perishable food product in a shipment container of claim 9, wherein the data storage device is a remote electronic device and wherein a wireless signal transmitter transmits the temperature of the product compartment to said remote electronic device.

13. The method of shipping a perishable food product in a shipment container of claim 9, wherein each of the product compartments is an integral product compartment, wherein the product compartment is a cavity within the temperature control compartment.

14. The method of shipping a perishable food product in a shipment container of claim 9, wherein the date is the date of harvest and the time is a time of harvest.

15. The method of shipping a perishable food product in a shipment container of claim 9, wherein the date is the date of shipment and the time is a time of shipment.

16. The method of shipping a perishable food product in a shipment container of claim 9, further comprising a moisture device for recording a moisture level of the product compartment, wherein the moisture level of the product compartment is transferred by a wireless transmitter to a remote electronic device.

17. The method of shipping a perishable food product in a shipment container of claim 9, wherein the global positioning device determines a location of the shipment container; and wherein the wireless signal transmitter transmits said location of said shipment container to the remote electronic device.

* * * * *